United States Patent [19]

Clausen-Schaumann

[11] Patent Number: 4,987,671
[45] Date of Patent: Jan. 29, 1991

[54] PROCESS FOR MOUNTING A TILTABLE COVER ON A VEHICLE ROOF

[75] Inventor: Andreas Clausen-Schaumann, Bernried, Fed. Rep. of Germany

[73] Assignee: Bayerische Motoren Werke AG, Fed. Rep. of Germany

[21] Appl. No.: 420,819

[22] Filed: Oct. 11, 1989

[30] Foreign Application Priority Data

Oct. 14, 1988 [DE] Fed. Rep. of Germany ....... 3835122

[51] Int. Cl.$^5$ ............................................. B23P 19/02
[52] U.S. Cl. ..................................... 29/434; 29/525.1; 296/216
[58] Field of Search .............. 29/428, 434, 525, 525.1; 296/216

[56] References Cited

U.S. PATENT DOCUMENTS

| | | | |
|---|---|---|---|
| 3,075,807 | 1/1963 | Werner | 296/216 X |
| 4,487,449 | 12/1984 | Igel et al. | 296/216 |
| 4,553,307 | 11/1985 | Kaltz et al. | 296/216 X |
| 4,798,410 | 1/1989 | Weller et al. | 296/216 X |
| 4,826,232 | 5/1989 | Wissler | 296/216 |

Primary Examiner—Timothy V. Eley
Assistant Examiner—Frances Chin
Attorney, Agent, or Firm—Evenson, Wands, Edwards, Lenahan & McKeown

[57] ABSTRACT

A process for the mounting of a tiltable cover at a vehicle roof includes the steps of, after the fastening of the tilt-out device of the roof to the underside of the roof, fastening a front cover end, through a roof opening, to a surrounding body so that it can be swivelled around a transverse shaft. Before the cover is swivelled into a closed position, which closes the roof opening, a gauging arrangement is mounted in the rear on the cover or on the vehicle roof which has a stop which, in the closed position, limits the swivelling-in of the cover. In its closed position, the cover is connected with a vertically adjustable cross-strut of the tilt-out device. The gauging arrangement may be formed by a magnetic or adhesive strip which is mounted at the rear cover area and projects toward the rear, or by a ledge which is placed on the vehicle roof in transverse direction and has a wall section which is directed downward through the roof opening, a stop being constructed at this wall section.

6 Claims, 2 Drawing Sheets

PROCESS FOR MOUNTING A TILTABLE COVER ON A VEHICLE ROOF

BACKGROUND AND SUMMARY OF THE INVENTION

The invention relates to a process for mounting a tiltable cover on a vehicle roof as well as to an arrangement for carrying out this process.

A process for mounting a tiltable cover on a vehicle roof is disclosed for sliding lifting roofs on motor vehicles. In a first process step, a tilt-out device for the cover is fastened to the underside of the vehicle roof. Then the front area of the cover, through an opening in the roof, is connected with a transverse shaft which is constructed at laterally opposite sliding blocks which can be adjusted in longitudinal guides of the roof. Subsequently, the cover is swivelled into a position which closes the opening in the roof. In this position, the cover is slightly lowered with resPect to the exterior surface of the roof.

In order to be able to connect the cover, in a closed position which is flush to the roof contour, with a vertically adjustable cross-strut of the tilt-out device, the cover must be lifted into a corresponding position. The precise adjustment of the cover to a closed position which is flush with the roof contour is difficult because the cover must be adjusted to the correct vertical position and must be fastened to the cross-strut, and, in addition, the vertical position of the cover must be checked at the top side of the vehicle roof. The adjusting of the vertical position of the cover to a closed position which is flush with the roof contour therefore often requires a repeated adjustment which is time consuming and unreliable.

Accordingly, an object of the present invention is to provide a process which permits a simple and fast adjusting of the cover to a height provided in the closed position.

These and other objects are achieved by a process which limits a swivelling movement of the cover at the closed position.

According to preferred embodiments of the process, it is particularly advantageous that, after the fastening of the tilt-out device, the cover must be swivelled only to a stop of a gauging arrangement located at the rear area of the cover to be at a height which, for example, is flush with the roof contour, at which the cover can be connected with the cross-strut. Since the cover, in the front, supports itself at a transverse shaft and, in the rear, at the stop of the gauging arrangement, the fastening of the cover to the cross-strut takes place free of the load of the cover. As far as the height is concerned, the front transverse shaft of the cover can easily be arranged such that the front cover area is also located at a height which is flush with the roof contour in the closed position of the cover. If a tiltable draft deflector is arranged between the front edge of the roof opening and the cover, this draft deflector can compensate for deviations in height of the transverse shaft which are caused by manufacturing tolerances.

It is another object of the invention to provide a gauging arrangement for carrying out the process of the present invention which, without damage to any parts, can be mounted at the cover or at the vehicle body and, after the mounting of the cover, can be easily removed.

This additional object and other objects are achieved by using a gauging arrangement which has a stop for limiting the swivelling movement of the cover in the closed position.

A magnetic or adhesive strip, according to one embodiment of the gauging arrangement, must only be placed or possibly pressed on a rear upper edge of the cover while projecting toward the rear in order to be fastened to the top side of the cover by magnetic or adhesive force. The area of the magnetic or adhesive strip which projects toward the rear forms a stop behind the opening in the roof, which after the swivelling of the cover, rests on the top side of the roof and fixes the closed position of the cover. Since, in the closed position, the magnetic or adhesive strip rests on the top side of the cover and, on the top side of the vehicle roof, the rear are of the cover is necessarily flush with the roof contour. A scratching of the surface of the cover which may, for example, be painted, can be avoided by the fact that the magnetic strip is covered by a soft material or the adhesive strip is constructed t be elastically bendable.

A ledge, according to another embodiment of the present invention, which can be used instead of the magnetic or adhesive strip, must only be placed on the vehicle roof behind the opening of the roof in transverse direction in such a manner that a wall section thereof projecting away from the ledge through the opening in the roof and in downward direction rests against the rear edge of the opening in the roof. If the cover which, in the front area, is pivotably fastened to the transverse shaft, is swivelled until it rests against the stop constructed in the lower area of the wall section of the ledge, the cover is disposed in a closed position which is, for example, flush with the roof contour in which, free of the load of the cover, it can be connected with the cross-strut. When the cover is tilted out, the ledge can be easily removed from the vehicle roof.

Other objects, advantages and novel features of the present invention will become apparent from the following detailed description of the invention when considered in conjunction with the accompanying drawings.

DETAILED DESCRIPTION OF THE DRAWINGS

Two embodiments of the invention are discussed below in detail with particular reference to the application drawings.

Figure 1:
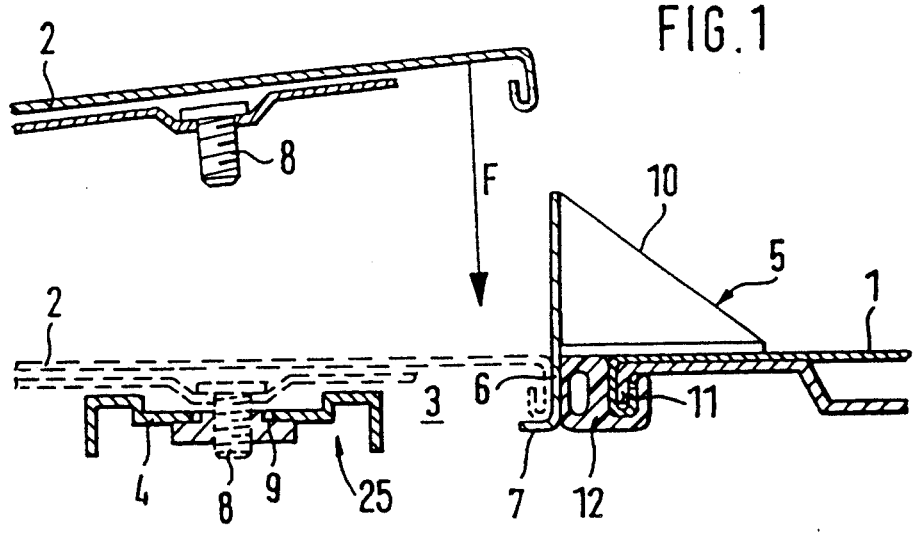
FIG. 1 is a longitudinal sectional view of the rear area of the cover of a first embodiment of the present invention.

A vehicle roof 1, which in a first embodiment, according to FIG. 1, is constructed as a sliding lifting roof, has a cover 2 which, after the fastening of a coffer which is not shown, is mounted in a lower area of a roof opening 3. The coffer, which is not shown, has laterally opposite longitudinal roof guides in which, in the first embodiment, one sliding body respectively is arranged in a longitudinally shiftable manner. At the coffer, a tilt-out device 25 for the cover 2 is arranged which has a vertically adjustable cross-strut 4. The cross-strut 4 may be vertically adjustable, for example, utilizing of tilt-out levers which are linked in a laterally pivotable manner and which, in each case, at one end are pivotably around a transverse shaft connected with a carriage which is shiftable in a longitudinal guide of the roof. However, the cross-strut 4 may also be vertically adjustable in a different manner.

For the mounting of the finished painted and preassembled cover 2 from above through the roof opening 3, a front area of the cover 2, which slopes downward in front, must be connected with a transverse shaft which is not shown. In the first embodiment, the transverse shaft is formed, for example, by pins which each extend transversely between the front ends of two legs which project toward the front from a sliding body which can be shifted in a longitudinal guide of the roof. In the first embodiment, arms are provided which project toward the front from the front area of the cover 2 and which each have a nose.

For the pivotable fastening of the cover 2, this cover 2 must only, by means of its arms, approach the transverse shaft at an angle of the cover 2 which is larger than the maximum tilt-out angle of the cover 2 after its mounting, and subsequently must be swivelled downward in the direction of the arrow F. After the cover 2 is swivelled around the transverse shaft into the tilt-out area of the mounted cover 2, the noses constructed at the arms reach either behind the pins or behind supporting shoulders constructed at the sliding bodies so that the cover 2, in its tilt-out area determined by elements of the tilt-out device 25, is firmly connected with the transverse shaft.

A pivotable connection of the front cover area with the transverse shaft may also take place by means of journals which project laterally away from the front cover area and which engage in connecting links constructed on the roof or on sliding bodies. In the same manner, it is possible that the front cover area, by means of screwed connections or other connecting devices, may be pivotably connected at the transverse shaft.

In order to be able to rapidly connect the cover 2 with the cross-strut 4, during the mounting, with the cover 2 in a closed position which is flush with the contour of the vehicle roof 1, before the cover 2 is swivelled in the direction of the arrow F, a ledge 5, which extends in transverse direction, is placed on an edge area of the vehicle roof 1 which is adjacent and behind the roof opening 3. In a front area thereof, the ledge 5 has a wall section 6 which is directed downward through the roof opening 3 and borders on the rear edge of the roof opening 3 and forms a stop 7 together with a projection which is directed toward the front at the lower end. When the cover 2 is swivelled until a lower wall area of the cover 2 rests against the stop 7 into the closed position shown by interrupted lines, the cover 2 is centered at the roof opening 3 in both a longitudinal and a transverse direction.

In this case, the sliding bodies, at which the transverse shaft is constructed, carry out corresponding longitudinal movements. The cover 2 can adjust itself in the transverse direction to the roof opening, because the cover 2 is transversely slidably fastened to the transverse shaft in an adjusting range. The projection 7 is constructed at the wall section 6 so that the cover 2, in the closed position shown by interrupted lines, is disposed in a position which is flush with the contour of the vehicle roof 1, in which the cover 2 can be connected with the cross-strut 4.

For this purpose, in the first embodiment, one threaded bolt 8 respectively, which projects laterally from the underside of the cover 2 in downward direction, is provided which penetrates a passage opening 9 in the cross-strut 4 of the tilt-out device 25. The passage opening 9, which is, for example, cylindrical in the first embodiment, has a diameter which is larger with respect to the threaded bolt 8 and which is dimensioned such that the cover 2, when the cross-strut 4 is held fast, can center itself at the roof opening 3 in both the longitudinal and transverse directions.

In the first embodiment, the wall section 6 of the ledge 5 is extended in an upward direction and supported by a diagonal supporting wall 10. The extended wall section 6A forms a centering surface which cooperates with the rear cover edge when the cover 2 is swivelled in the direction of arrow F. A sealing device 12 is fastened to an edge 11 of the roof opening 3, in the first embodiment, the sealing device 12 being constructed as a hose seal. Between the front edge of the roof opening 3 and the cover 2, a draft deflector is arranged which is not shown and which, in the closed position of the cover is swivelled in an elastically deformed.

When the cover 2 is lowered from its closed position and moved rearwardly, the draft deflector automatically tilts out under an elastic force thereof which is directed rearwardly. The wall section 6 of the ledge 5 in the first embodiment, by mean of webs which are not shown, supports itself at the sealing device 12 against the elastic force of the draft deflector directed toward the rear in such a manner that the cover 2 which is connected with the cross-strut 4, in the closed position, does not compress or compresses only slightly the section of the sealing device 12 which extends transversely in the rear after the ledge 5 is removed. The ledge 5 can be removed from the vehicle roof 1 without difficulties when the mounted cover 2 is tilted out. In the first embodiment, the ledge 5 extends, for example, along the whole width of the roof opening 3.

Figure 2:
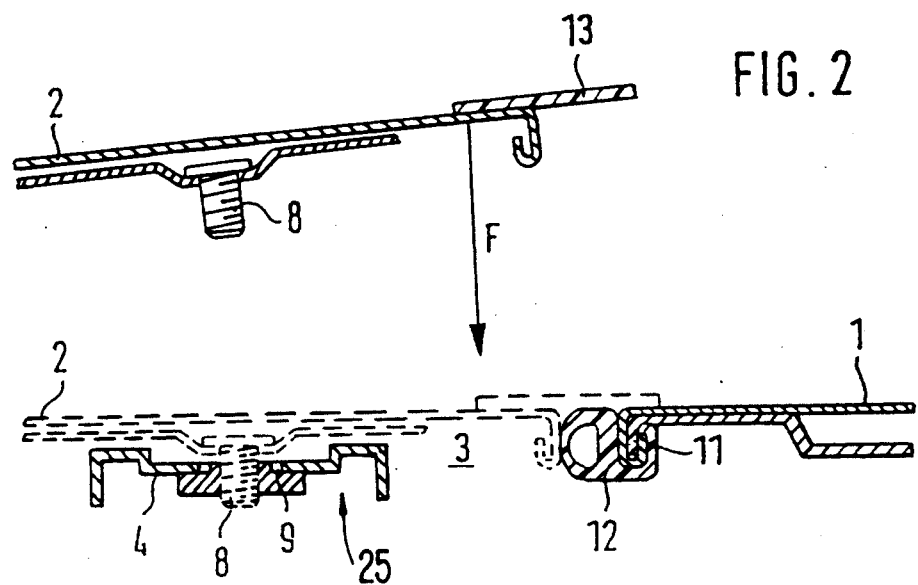
FIG. 2 is a view, which corresponds to FIG. 1, of a second embodiment having a different mounting arrangement.

A second embodiment shown in FIG. 2 also has a vehicle roof 1 which is constructed as a sliding lifting roof and has a cover 2 which, after being mounted, in a closed position thereof, closes off a roof opening 3. As in the first embodiment, a tilt-out device for the cover 2 is first mounted at the underside of the vehicle roof 1, this tilt-out device 25 having a vertically adjustable cross-strut 4. In the same manner as in the first embodiment, the front area of the painted and preassembled cover 2 is mounted so that it can be swivelled around a transverse shaft thereof. In order to avoid repetitions, components which correspond to those of the first embodiment are provided with the same reference numbers.

Instead of a ledge 5, the second embodiment has an arrangement which is formed by a magnetic or adhesive strip 13 for facilitating the mounting of the cover 2.

Before the cover 2 is swivelled in the direction of the arrow F, the magnetic or adhesive strip 13 must be mounted on a top side of a rear cover area projecting toward the rear, as shown, this magnetic or adhesive strip 13 being held at the cover 2 by magnetic or adhesive force. In this second embodiment, the area of the magnetic or adhesive strip 13 which projects toward the rear forms a stop which, after the cover 2 was swivelled in the direction of the arrow F, rests against the top side of the vehicle roof 1 and fixes the closed position of the cover 2 which is shown by interrupted lines.

In the closed position, the cover 2 which is flush with the roof contour, must be connected with the cross-strut 4 of the tilt-out device 25 by means of threaded bolts 8. The magnetic or adhesive strip 13 may be removed after the mounting of the cover 2, for example, when the cover 2 is tilted out. In the case of the second embodiment, the adhesive strip 13 is constructed to be elastically bendable. After the removal of the adhesive strip 13, the adhesive layer of the adhesive strip 13 leaves no residues on the cover 2 or the vehicle body 1. When a magnetic strip is used, it may be surrounded by a soft material. In the second embodiment, the magnetic or adhesive strip 13 extends, for example, along the whole width of the roof opening 3.

Figure 3:
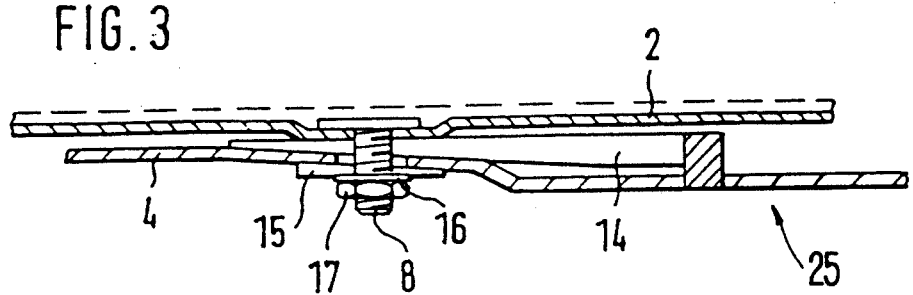
FIG. 3 is a longitudinal sectional view of a wedging arrangement provided in the rear cover area for the fastening of the cover of FIG. 1 or FIG. 2 to a cross-strut.
Figure 4:
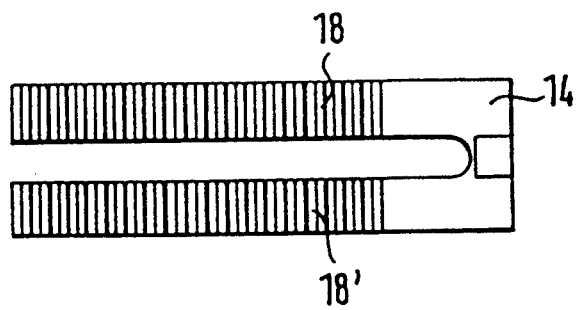
FIG. 4 is a view from below of the wedge according to FIG. 3.

For the fastening of the cover 2 according to the embodiments of FIG. 1 or of FIG. 2 to the cross-strut 4 of the tilt-out device, a wedging arrangement is provided as best seen in FIGS. 3 and 4. The wedging arrangement includes of a U-shaped wedge 14 which, by means of legs 18, 18' thereof which enclose the threaded bolt 8, is laterally inserted sufficiently far so the wedge 14 fully occupies the space between the cover 2 and of the cross-strut 4 which has a corresponding wedge shape. In the embodiment of the wedge 14 shown in FIGS. 3 and 4, a wedge disk 15, which is wedge-shaped in an opposite direction to the wedge 14, and a shim 16 are fitted onto the threaded bolt 8 from below and are screwed together with a threaded nut 17 which is equipped with a clamping bush in order to protect again torsion. An opening, which is constructed centrically in the wedge disk 15, for the passage of the threaded bolt 8, has a diameter which is only slightly larger than the threaded bolt 8 so that the wedge disk 15 cannot move laterally away under the tension force of the threaded nut 17.

The wedge 14 of the wedging arrangement according to FIG. 3 is shown from below in FIG. 4. As shown, a surface of the wedge 14 facing the cross-strut 4, has, for example, teeth which extend transversely with respect to the legs 18, 18' of the wedge 14, press themselves into a surface of the cross-strut 4 and, as a result, prevent an unintentional lateral shifting of the wedge 14.

Figure 5:
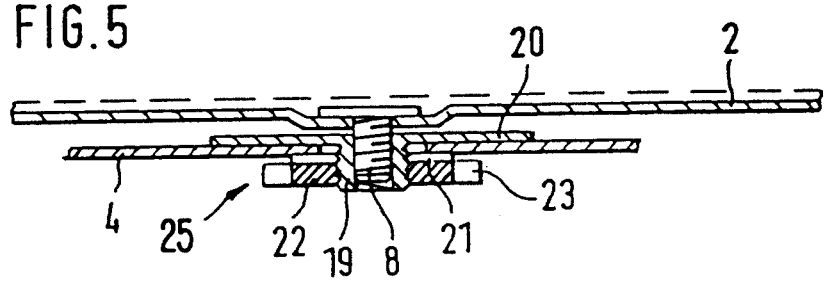
FIG. 5 is a view corresponding to FIG. 3 of the cover which is connected with the cross-strut in a different manner.

FIG. 5 shows an alternative connection arrangement of the cover 2 with the cross-strut 4. The connection, which is constructed as a double screwed connection, has a threaded bush 19 which is screwed onto the threaded bolt 8. In the closed position of the cover 2, the threaded bush 19 is turned on the threaded bolt 8 and therefore is axially adjusted until a radially projecting flange 20 of the threaded bush 19 rests from above against the cross-strut 4. Subsequently, a lock washer 21 is fitted from below onto the downwardly projecting threaded bush 19, and a groove nut 22 is screwed onto an external thread of the threaded bush 19. In order to protect the groove nut 22 against torsion, radially projecting noses of the lock washer 21 are shifted into radial grooves of the groove nut 22.

Figure 6:
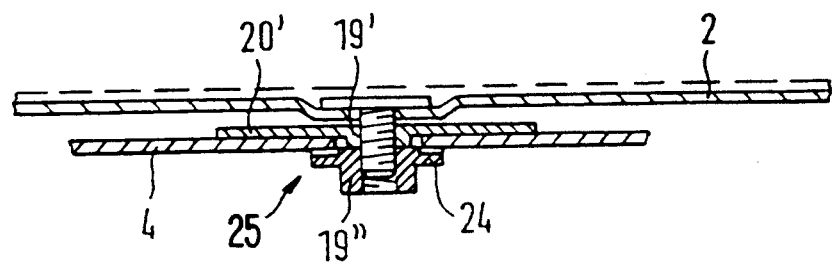
FIG. 6 is a view corresponding to FIG. 5 with a different screw fastening of the cover to the cross-strut.

Another connection arrangement of the cover 2 with the cross-strut 4, which can be used as an alternative, is shown in FIG. 6 and is established similarly to the double screwed connection according to FIG. 5. A threaded bush 19', which is screwed onto the threaded bolt 8, in the closed position of the cover 2 is rotated until a radial flange 20' of the threaded bush 19' rests, from above, against the cross-strut 4. In the case of this connection arrangement, a threaded bush 19" which is provided with a radial collar 24 is screwed from below onto the threaded bolt 8 and is secured against torsion in a manner which is not shown.

The two embodiments were explained for the case of a vehicle roof which is constructed as a sliding lifting roof. In the same manner, the invention may also be used for mounting tiltable covers of a vehicle roof constructed as a lifting roof. Instead of a coffer, a frame or the like is also provided which accommodates the tilt-out device of the cover. A fastening of the cover to the cross-strut may also take place differently than indicated in FIGS. 3, 5 and 6.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A process for mounting a tiltable cover as a vehicle roof, comprising the steps of:
   fastening a front cover end of the cover to supporting body of a tilt-out device to permit swivelling movement of the cover about a transverse axis into and away from a roof opening in the vehicle roof;
   removably mounting a member with a stop portion at the rear of the roof opening to limit the swivelling movement of the cover as the cover is moved to a closed position and fix the cover at a desired height;
   connecting the cover at the desired height with a cross-strut of the tilt-out device; and
   swivelling the cover sufficiently away from the roof opening and removing the member with a stop portion to permit vertically precise and rapid mounting of the cover.

2. A process according to claim 1, wherein the stop is affixed at a rear area of a roof opening of a vehicle body.

3. A process according to claim 2, wherein the stop is affixed to the vehicle body.

4. A process according to claim 1, wherein the stop is affixed on the cover.

5. A process according to claim 1, wherein the stop positions the cover flush with a contour of the vehicle roof.

6. A process according to claim 1, further comprising the step of fastening the cover to a vertically adjustable cross-strut of the tilt-out device.

* * * * *